(12) United States Patent
Ruegsegger et al.

(10) Patent No.: US 10,072,769 B2
(45) Date of Patent: Sep. 11, 2018

(54) CHARGED CYLINDER VALVE RETENTION ARRANGEMENT

(71) Applicant: Goodrich Corporation, Charlotte, NC (US)

(72) Inventors: Nick Ruegsegger, Peoria, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 145 days.

(21) Appl. No.: 14/971,210

(22) Filed: Dec. 16, 2015

(65) Prior Publication Data

US 2017/0175914 A1    Jun. 22, 2017

(51) Int. Cl.
| | | |
|---|---|---|
| *F16L 3/00* | (2006.01) | |
| *F16K 27/12* | (2006.01) | |
| *B64D 25/14* | (2006.01) | |

(52) U.S. Cl.
CPC .............. *F16K 27/12* (2013.01); *B64D 25/14* (2013.01); *Y10T 137/6851* (2015.04)

(58) Field of Classification Search
CPC ......... Y10T 137/7062; Y10T 137/6906; Y10T 137/6851; F16K 27/12; B64D 25/14
See application file for complete search history.

(56) References Cited

U.S. PATENT DOCUMENTS

| | | | | |
|---|---|---|---|---|
| 1,833,924 A | * | 12/1931 | Wayer ..................... | F17C 13/06 137/382 |
| 3,756,450 A | * | 9/1973 | Crose, Jr. ................ | F17C 13/06 137/382 |
| 3,910,532 A | | 10/1975 | Fischer | |
| 4,125,235 A | * | 11/1978 | Fitzgerald .............. | B64C 1/143 244/129.5 |
| 4,375,877 A | | 3/1983 | Shorey | |
| 4,719,877 A | * | 1/1988 | Delage ..................... | F23K 5/20 122/17.2 |
| 5,261,559 A | * | 11/1993 | Salvucci, Sr. ......... | F17C 13/085 137/382 |
| 5,429,152 A | * | 7/1995 | Van Straaten ........ | F17C 13/002 137/377 |
| 7,089,956 B1 | | 8/2006 | Davidson | |
| 7,434,600 B1 | * | 10/2008 | Swierkocki ............. | B64C 25/56 141/46 |
| 2014/0191505 A1 | | 7/2014 | MacNeal | |
| 2016/0311543 A1 | * | 10/2016 | Schmidt .................. | F15B 15/14 |

\* cited by examiner

*Primary Examiner* — Jessica Cahill
(74) *Attorney, Agent, or Firm* — Snell & Wilmer, L.L.P.

(57) ABSTRACT

A retention arrangement for a charged cylinder valve may comprise a member at least partially perimetrically surrounding the charged cylinder valve, the member including a first portion configured to axially retain the charged cylinder valve proximate a charged cylinder and including a second portion configured to radially retain the charged cylinder valve proximate the charged cylinder.

13 Claims, 6 Drawing Sheets

US 10,072,769 B2

CHARGED CYLINDER VALVE RETENTION ARRANGEMENT

FIELD

The present disclosure relates to charged cylinders, and, more specifically, to a retention arrangement for a charged cylinder.

BACKGROUND

Fuselage mounted evacuation systems are typically mounted in a lower portion of an aircraft, just above the belly fairing. The non-exposed, exterior portion of the packboard is exposed to an area that has many hydraulic and electrical systems exposed. Mounted to the backside of the packboard is a charged cylinder used to inflate the evacuation system. A failure of the valve could allow the charged cylinder or valve to cause damage to nearby systems if not contained.

SUMMARY

Systems and methods for retaining a valve to a charged cylinder are disclosed herein. A retention arrangement for a charged cylinder valve may comprise: a member at least partially perimetrically surrounding the charged cylinder valve, the member including a first portion configured to axially retain the charged cylinder valve proximate a charged cylinder and including a second portion configured to radially retain the charged cylinder valve proximate the charged cylinder.

In various embodiments, the retention arrangement may further comprise a flange coupled to the charged cylinder. The retention arrangement may further comprise an attachment feature configured to couple the member to the flange. The attachment feature may comprise an annular geometry. The retention arrangement may further a fastener located at least partially within an aperture disposed in the attachment feature and a receiving aperture disposed in the flange for coupling the attachment feature to the flange. The retention arrangement may further comprise at least one link coupled between the member and the attachment feature. The at least one link may comprise at least one of a rod, bar, or plate. The member may include a plate and at least one tab extending away from the plate. The member may include a plate and a cylindrical boss extending from the plate. The cylindrical boss may comprise at least one of a cut-out or an equipment aperture. The flange may be coupled to the charged cylinder via a glass wrap. The flange may comprise an annular geometry. The member and the charged cylinder valve may be separated by a gap.

A charged cylinder arrangement may comprise: a charged cylinder; a valve coupled to the charged cylinder; and a retention arrangement comprising a member at least partially perimetrically surrounding the charged cylinder valve, the member including a first portion configured to axially retain the charged cylinder valve proximate the charged cylinder and including a second portion configured to radially retain the charged cylinder valve proximate the charged cylinder.

In various embodiments, the retention arrangement may further comprise a flange coupled to the charged cylinder via a glass wrap. The retention arrangement may further comprise an attachment feature configured to couple the member to the flange. The glass wrap comprises an outer layer of the charged cylinder, the glass wrap at least partially encasing the charged cylinder. The retention arrangement may further comprise at least one link located between the member and the attachment featured configured to couple the member to the attachment feature. The first portion of the member may include a plate and the second portion of the member may include at least one tab extending away from the plate.

A method for retaining a valve to a charged cylinder may comprise: at least partially surrounding the valve with a retention arrangement; and coupling the retention arrangement to the charged cylinder, the retention arrangement including a first portion configured to axially retain the valve proximate the charged cylinder and including a second portion configured to radially retain the valve proximate the charged cylinder.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Charged cylinder valves may be contained, by a retention arrangement, to a compressed cylinder in order to prevent the valve from leaving the cylinder in the event of a valve or cylinder (tank) failure. The retention arrangement may also prevent the charged cylinder from creating significant enough thrust to become a projectile.

Figure 1:
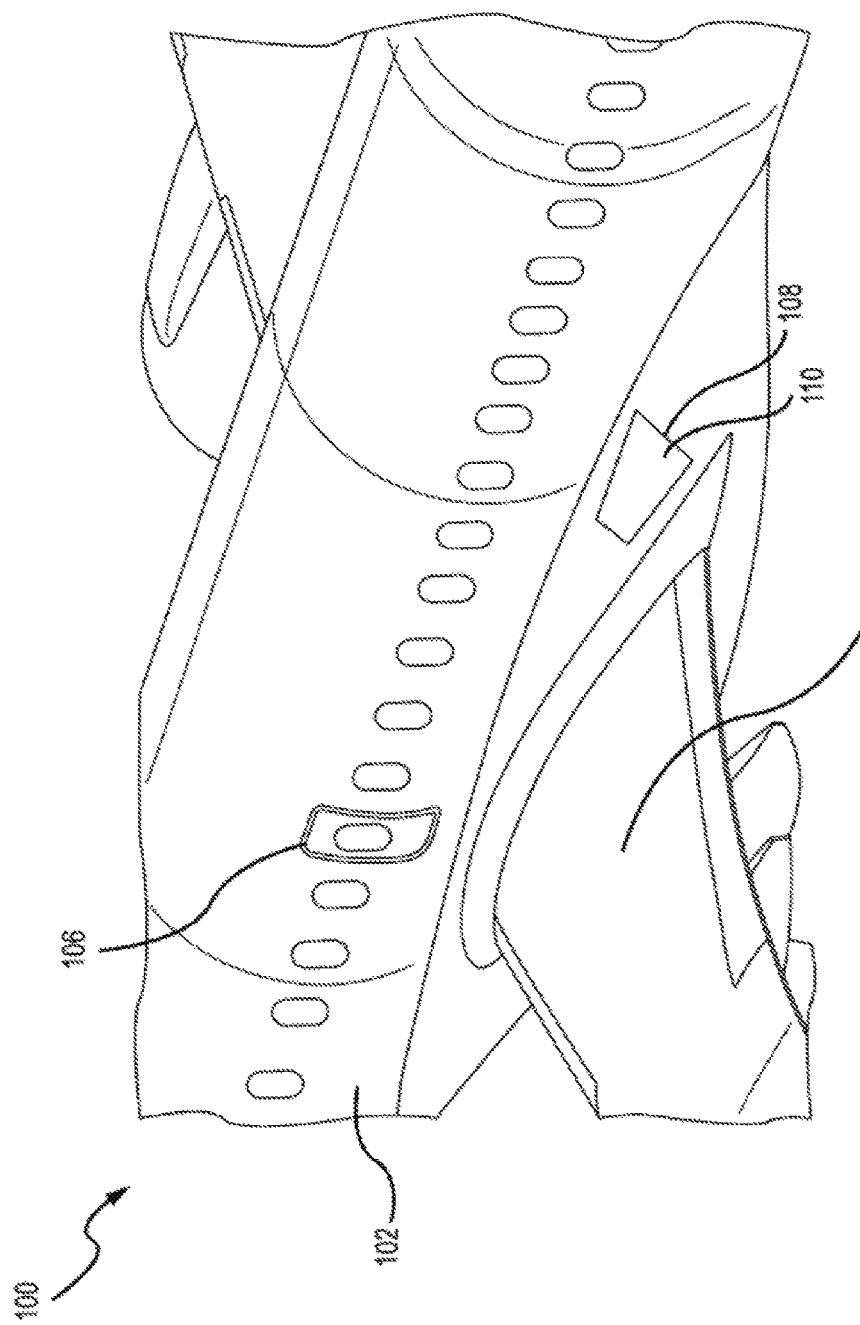
FIG. 1 illustrates an exemplary aircraft with an evacuation system, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Panel 110 may cover evacuation slide assembly 108 when installed on aircraft 100. Evacuation slide assembly 108 may jettison panel 110 and deploy an inflatable slide in response to emergency exit door 106 opening.

Figure 2:
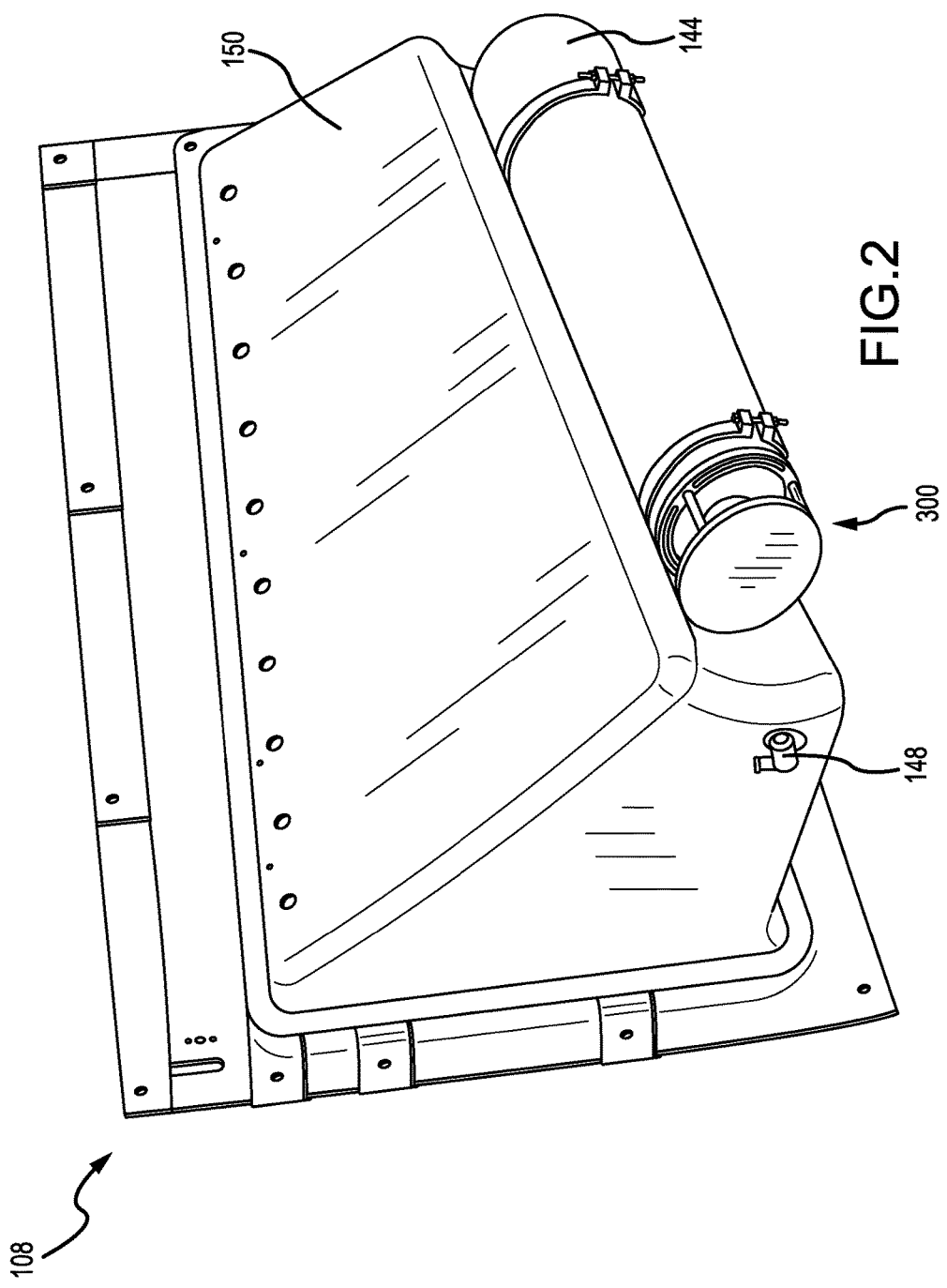
FIG. 2 illustrates an emergency evacuation assembly with a charged tank and a retention arrangement, in accordance with various embodiments.

With reference to FIG. 2, evacuation slide assembly 108 is shown as viewed from an inboard direction, in accordance with various embodiments. Evacuation slide assembly 108 may include housing 150 (also referred to as a packboard). Charged tank 144 may be mounted to the back of housing 150. Charged tank 144 may provide pressurized gas to inflate a slide, raft, or the like. Charged tank 144 may be pneumatically coupled to components of evacuation slide assembly 108 through inlet 148. Thus, various hoses, tubes, or the like may be coupled between charged tank 144 and inlet 148 to place charged tank 144 in fluid communication with components of evacuation slide assembly 108. A retention arrangement 300 may be coupled to charged tank 144. Retention arrangement 300 may accommodate hoses which may extend from charged tank 144, via a valve for example, to other components of evacuation slide assembly 108, such as inlet 148 for example.

Figure 3:
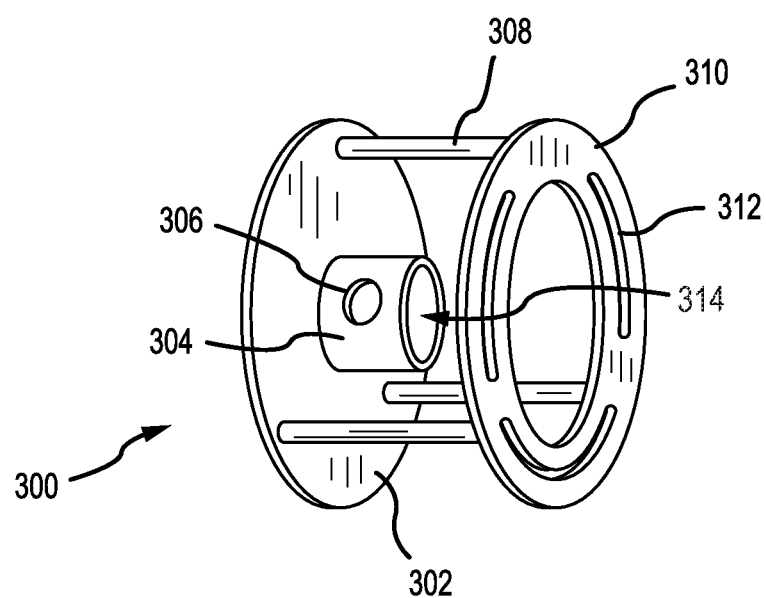
FIG. 3 illustrates a retention arrangement, in accordance with various embodiments.

With reference to FIG. 3, retention arrangement 300 may include plate 302, retainer 304, link 308, and attachment feature 310. In various embodiments, plate 302, retainer 304, link 308, and attachment feature 310 may be referred to herein as a retention arrangement. In various embodiments, plate 302 and retainer 304 may be referred to herein as a member. In various embodiments, retainer 304 may comprise an aperture (also referred to herein as equipment aperture) 306. Equipment aperture 306 may accommodate hoses or other equipment which may extend from valve 420 (see FIG. 4). In various embodiments, retainer 304 may comprise an extruded boss, cylindrical boss, tab, or the like extending from plate 302. In various embodiments, plate 302 and retainer 304 may be collectively referred to herein as a member including a first portion and a second portion. In various embodiments, first portion may comprise plate 302. In various embodiments, second portion may comprise retainer 304. In various embodiments, link 308 may comprise a bar, rod, tube, plate, or the like. In various embodiments, attachment feature 310 may comprise an annular ring or disk. Attachment feature 310 may comprise one or more receiving apertures 312. Receiving aperture 312 may comprise an opening, slot, aperture, or the like. In various embodiments, retention arrangement 300 may comprise a receiving cavity 314. Receiving cavity 314 may be configured to receive a valve for containing the valve within receiving cavity 314.

Figure 4:
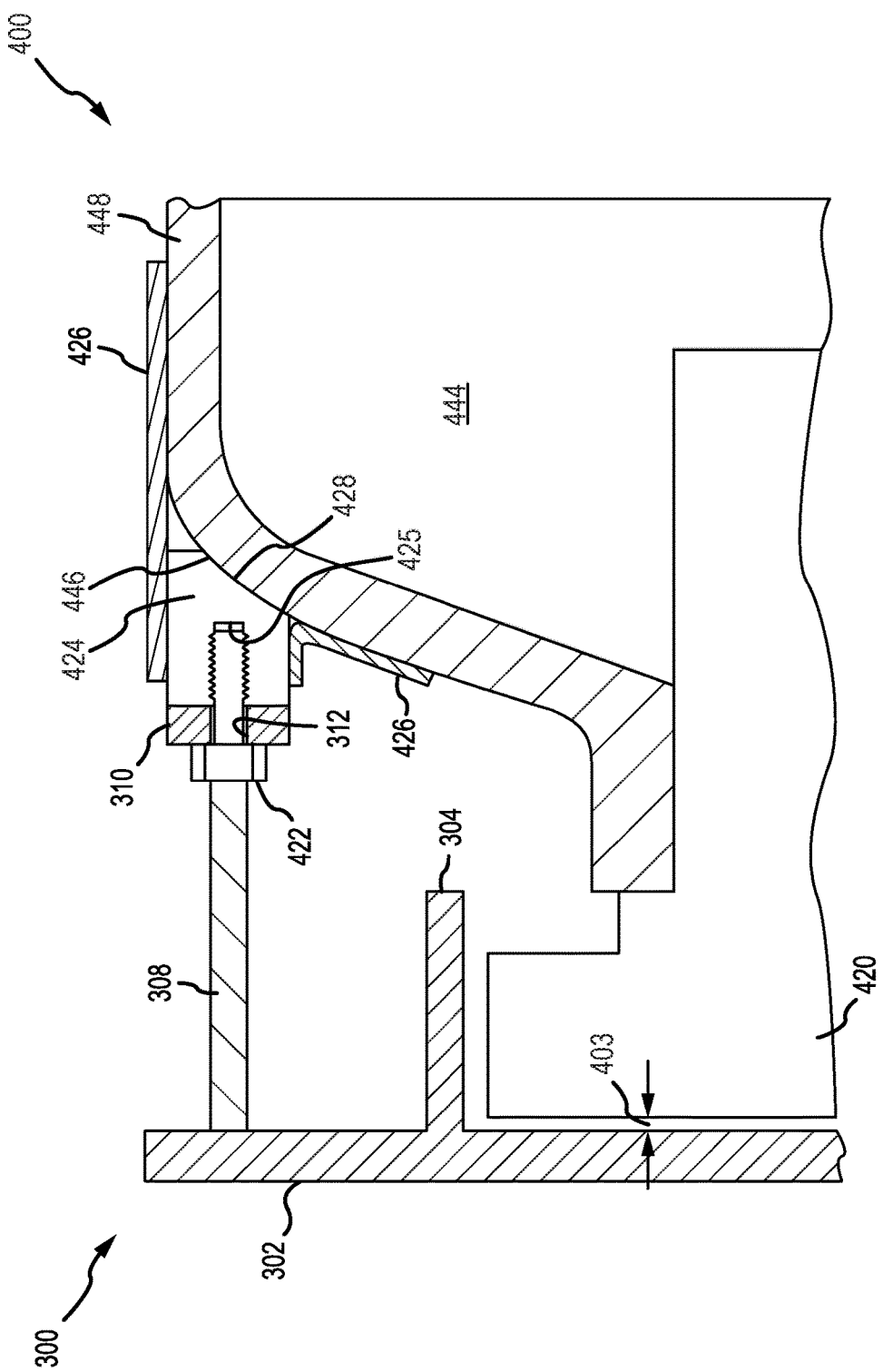
FIG. 4 illustrates a partial cross-section view of a charged cylinder assembly, in accordance with various embodiments.

With respect to FIG. 4, elements with like element numbering, as depicted in FIG. 3, are intended to be the same and will not necessarily be repeated for the sake of clarity.

With reference to FIG. 4, a partial cross-section view of a charged cylinder assembly 400 is illustrated with retention arrangement 300 in an installed position, in accordance with various embodiments. Charged cylinder assembly 400 may include retention arrangement 300, flange 424, valve 420, and charged tank 444. Retainer 304 may be configured to radially retain valve 420 with respect to charged tank 444. Thus, plate 302 may be configured to radially retain valve 420 proximate charged tank 444. Retainer 304 may circumferentially surround valve 420. Retainer 304 may perimetrically surround valve 420. Valve 420 may be coupled to charged tank 444. Plate 302 may axially retain valve 420 with respect to charged tank 444. Thus, plate 302 may be configured to axially retain valve 420 proximate charged tank 444.

In various embodiments, flange 424 may be attached to charged tank 444. Flange 424 may comprise an annular geometry. Flange 424 may circumferentially surround charged tank 444. Flange 424 may comprise a mating surface 428. Mating surface 428 may comprise a geometry which is complementary to the outer surface 446 of charged tank 444. An adhesive or glue may be applied between mating surface 428 and outer surface 446 to attach or bond flange 424 to charged tank 444. Charged tank may comprise an outer layer 448. Outer layer 448 may comprise carbon fiber, glass fiber, or the like. A glass wrap 426 may be applied over charged tank 444 and flange 424 to attach flange 424 to charged tank 444. In various embodiments, glass wrap 426 may comprise an outer layer of charged tank 444. For example, outer layer 448 may comprise glass wrap 426. Stated another way, glass wrap 426 may comprise outer layer 448. Accordingly, flange 424 may be attached to charged tank 444 during assembly and/or manufacture of charged tank 444. Stated another way, flange 424 may be built into the outer layer 448 of charged tank 444. Glass wrap may comprise a glass fiber and a resin.

Flange 424 may comprise one or more apertures 425. In various embodiments, flange 424 may comprise 3 apertures 425. However flange 424 may comprise 4 or more apertures 425. Aperture 425 may comprise a threaded bore. Fastener 422 may be inserted into receiving aperture 312 and threaded or otherwise attached to flange 424 via aperture 425 to couple attachment feature 310 to flange 424. Thus, attachment feature 310 may be located adjacent to flange 424.

In various embodiments, link 308 may be welded to plate 302 and or attachment feature 310. In various embodiments, link 308 may be threadingly attached to plate 302 and/or attachment feature 310. In various embodiments, link 308, plate 302, and/or attachment feature 310 may comprise a single, unitary member. In various embodiments, plate 302 and valve 420 may be separated by a gap 403 when retention arrangement 300 is in an installed position.

Figure 5:
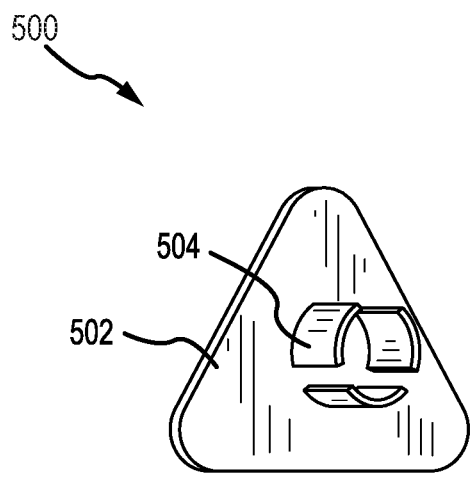
FIG. 5 illustrates a member of a retention arrangement including a triangular plate and a retainer comprising a plurality of tabs, in accordance with various embodiments.

With reference to FIG. 5, a member (also referred to herein as valve head containment feature) 500 is illustrated, in accordance with various embodiments. As previously mentioned, valve head containment feature 500 may comprise a plate 502 and at least one retainer 504. Retainer 504 may comprise an extruded boss or tab as illustrated in FIG. 5. Retainer 504 may comprise a curved or circular geometry. Retainer 504 may be configured to accommodate valve 420 (see FIG. 4) or hoses coupled to valve 420. Plate 502 may comprise a triangular geometry as illustrated in FIG. 5. However, plate 502 may comprise any geometry including square, rectangular, trapezoidal, round and elliptical.

Figure 6:
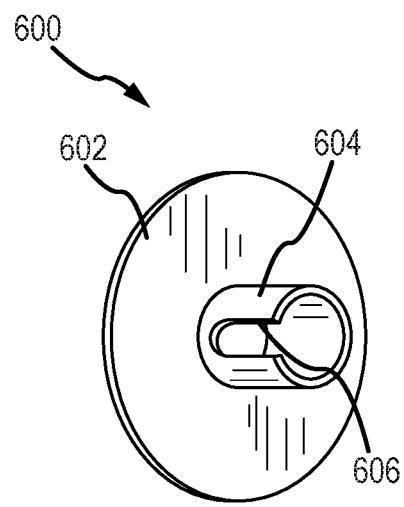
FIG. 6 illustrates a member of a retention arrangement including a circular plate and a retainer comprising an extruded cylinder, in accordance with various embodiments.

With reference to FIG. 6, a member (also referred to herein as valve head containment feature) 600 is illustrated, in accordance with various embodiments. As previously mentioned, valve head containment feature 600 may comprise a plate 602 and at least one retainer 604. Retainer 604 may comprise a cylindrical boss as illustrated in FIG. 6. Retainer 604 may comprise a curved or circular geometry. Retainer 604 may comprise a cut-out 606. Cut-out 606 may be configured to accommodate valve 420 (see FIG. 4) or hoses coupled to valve 420. Plate 602 may comprise a circular geometry as illustrated in FIG. 6.

Figure 7:
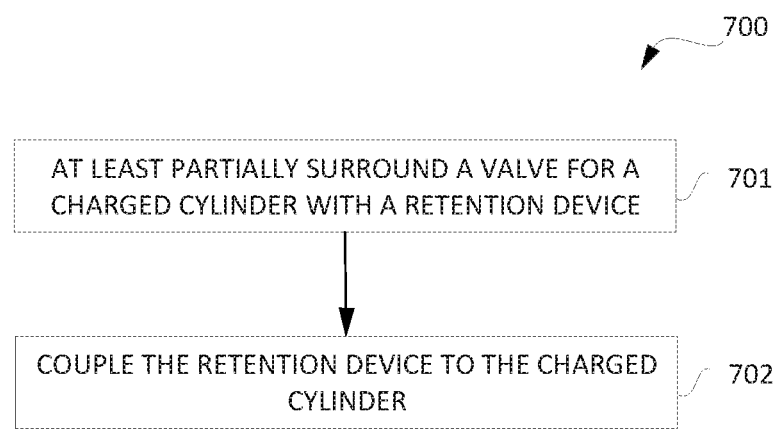
FIG. 7 provides a method for retaining a valve to a charged cylinder, in accordance with various embodiments.

With reference to FIG. 7, a method 700 for retaining a valve to a charged cylinder. In various embodiments, method 700 may include at least partially surrounding a valve for a charged cylinder with a retention arrangement (see step 701). Method 700 may include coupling the retention arrangement to the charged cylinder (see step 702).

With further reference to FIG. 4, step 701 may include circumferentially surrounding valve 420 via retainer 304. Step 702 may include coupling plate 302 and retainer 304 to flange 424 located on the charged tank 444. Plate 302 may include retainer 304 extending from plate 302 to radially retain valve 420. Stated another way, the retention arrangement may include at least one of a tab or a cylindrical boss extending from the retention arrangement to radially retain valve 420.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retention member for retaining a valve of a charged cylinder, the retention member comprising:
   a plate configured to axially retain the valve of the charged cylinder proximate the charged cylinder;
   a retainer comprising a boss extending from the plate, wherein the boss defines a receiving cavity that is configured to perimetrically surround and radially retain the valve of the charged cylinder proximate the charged cylinder;
   an annular attachment feature configured to be coupled to the charged cylinder; and
   a link extending between the plate and the annular attachment feature, wherein the link comprises a plurality of circumferentially distributed bars extending between the plate and the annular attachment feature;
   wherein the plurality of circumferentially distributed bars extend parallel to and are disposed radially outward of the boss of the retainer.

2. The retention member of claim 1, further comprising a flange coupled to the annular attachment feature and configured to be disposed between the annular attachment feature and the charged cylinder.

3. The retention member of claim 2, further comprising a fastener located at least partially within a slot disposed in the annular attachment feature, wherein the flange defines a receiving aperture and wherein the fastener extends through the slot and into the receiving aperture for coupling the annular attachment feature to the flange, wherein the fastener extends parallel to the plurality of circumferentially distributed bars.

4. The retention member of claim 2, wherein the flange is coupled to the charged cylinder via a glass wrap.

5. The retention member of claim 1, wherein the boss comprises at least one of a cut-out or an equipment aperture that is separate from an opening of the receiving cavity.

6. The retention member of claim 1, wherein the plate is planar.

7. The retention member of claim 1, wherein the plate and the valve of the charged cylinder are separated by a gap.

8. A charged cylinder assembly comprising:
a charged cylinder;
a valve coupled to the charged cylinder; and
a retention arrangement comprising a member at least partially perimetrically surrounding the charged cylinder valve, the member including a first portion configured to axially retain the charged cylinder valve proximate the charged cylinder and including a second portion configured to radially retain the charged cylinder valve proximate the charged cylinder, and a flange coupled to the charged cylinder via a glass wrap.

9. The charged cylinder assembly of claim 8, wherein the retention arrangement further comprises an attachment feature configured to couple the member to the flange.

10. The charged cylinder assembly of claim 9, wherein the retention arrangement further comprises at least one link located between the member and the attachment featured configured to couple the member to the attachment feature.

11. The charged cylinder assembly of claim 9, wherein the first portion of the member includes a plate and the second portion of the member includes at least one tab extending away from the plate.

12. The charged cylinder assembly of claim 8, wherein the glass wrap comprises an outer layer of the charged cylinder, the glass wrap at least partially encasing the charged cylinder.

13. A method for retaining a valve to a charged cylinder comprising:
at least partially surrounding the valve with a retention member;
and coupling the retention member to the charged cylinder,
the retention member including:
a plate;
a retainer comprising a boss extending from the plate, wherein the boss defines a receiving cavity;
an annular attachment feature; and
a link extending between the plate and the annular attachment feature, wherein the link comprises a plurality of circumferentially distributed bars extending between the plate and the annular attachment feature;
wherein:
the plurality of circumferentially distributed bars extend parallel to and are disposed radially outward of the boss of the retainer;
the at least partially surrounding the valve with the retention member comprises inserting the valve of the charged cylinder into the receiving cavity such that the retainer perimetrically surrounds and radially retains the valve of the charged cylinder proximate the charged cylinder; and
the coupling the retention member to the charged cylinder comprises coupling the annular attachment feature to the charged cylinder via a flange.

* * * * *